Patented June 1, 1954

2,680,090

UNITED STATES PATENT OFFICE 2,680,090

PREPARATION OF PARTIAL GLYCERIDES

William Gordon Rose, Berkeley, Calif., and Arnold Kent Balls, West Lafayette, Ind., assignors to the United States of America as represented by the Secretary of Agriculture No Drawing. Application April 21, 1953,
Serial No. 350,271

3 Claims. (Cl. 195—30)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This application is a continuation in part of our prior application Serial No. 262,162, filed Dec. 17, 1951.

This invention concerns the partial hydrolysis of glyceride oils whereby to obtain products containing high proportions of partial glycerides, that is, mono- and di-glycerides. In particular, the prime object of this invention is the provision of processes of partially hydrolyzing glyceride oils by the use of a lipase preparation in the presence of a controlled amount of water whereby to obtain products containing a proportion of partial glycerides equal to or even greater than the proportion of fatty acids.

In general, it is known that lipase preparations can be used to hydrolyze glyceride oils. However, in the previous processes, the conditions used led mainly to the formation of fatty acids; partial glycerides were present in the final product only in minor amount—much less than the amount of free fatty acids. As a consequence, the prior processes are useful only when the aim is to produce fatty acids; such processes are not suited to production of partial glycerides.

It has now been found that the proportion of water in the initial hydrolysis mixture of oil and lipase has a critical effect on the proportion of partial glycerides and fatty acids in the product. Thus if a high level of water is present, the product contains a considerably smaller proportion of partial glycerides than of fatty acids. On the other hand if the proportion of water is properly restricted, the product contains a proportion of partial glycerides at least as great as the proportion of fatty acid. Our experiments have shown, for example, that where the initial proportion of water is 10.5% (based on the weight of oil) the product contains less than one-half as much partial glycerides as fatty acids. On the other hand by restricting the proportion of water to 0.5%, the product contains almost twice as much partial glycerides as fatty acids. Thus in accordance with this invention the lipase-catalyzed hydrolysis of glyceride oils is conducted in the presence of about from 0.5% to 2.5% of water, based on the weight of oil, whereby the amount of partial glycerides in the product is equal to, or in many cases, greater than the amount of fatty acids in the product.

The significance of this invention is that partial glycerides are valuable materials in many applications. Thus in the preparation of shortenings it is necessary that they contain a small proportion (1–5%) of mono- and di-glycerides which act as emulsifiers and thus enable the shortening to mix (cream) more thoroughly and rapidly with the various constituents, particularly to blend the flour, water, and fat in the preparation of bakery products. In preparing margarine, the fat stock must also contain mono- and di-glycerides so that the fat will emulsify properly with the non-fat milk solids and other non-fatty flavoring and/or nutritive constituents of the margarine. On the other hand, fatty acids are not useful in such connections but are considered deleterious and must be removed from the product. Obviously if the proportion of partial glycerides to fatty acids is increased then less fatty acid will have to be removed so that purification of the hydrolysis product for ultimate use will be simpler and less expensive.

The lipase preparation used to catalyze the hydrolysis in accordance with this invention may be obtained from various sources, for example, plant materials such as cottonseed, soybean, castor bean, sunflower seed, etc.; from animal sources such as the pancreas of cattle, swine, etc.; or from fungi or bacteria. Castor bean lipase preparations are preferred and may be produced in the following manner:

The castor beans are first ground with water to make a paste. This paste is then mixed with water to form a preparation of milk-like consistency and allowed to age for at least several hours. This aging is important as it enables certain autolytic reactions to proceed whereby the lipase preparation is enhanced in lipolytic activity as compared with a product made from the un-aged milk. The aging is usually carried out at a cool temperature to prevent microbial spoilage, i. e., 2° to 10° C. and for a period of from 2 to 12 hours. Usually for convenience the milk is aged overnight.

The pH of the milk is then adjusted to a range from 4 to 5 by addition of an acid such as hydrochloric, sulphuric, phosphoric, acetic, etc. Preferably at this point a suitable buffer such as potassium acid phthalate or an alkali metal hydrogen phosphate or citrate is added to maintain the pH in the desired range. The adjustment of the pH to the stated range is a critical factor to obtain a high potency product. Thus preparation using pH's of 3.5 and 6 have only ½ and ¹⁄₂₀, respectively, the activity of those prepared at pH 4.25.

The pH-adjusted product is then subjected to centrifugation to isolate the lipase cream which is washed several times with distilled water and re-centrifuged. This lipase cream is very high in lipolytic activity and serves as a useful material for carrying out various hydrolytic processes as hereinafter described. The cream is subject to mold growth and hence must be kept in cold storage (2°–4° C.), under such conditions it retains high activity for several months.

To prepare a more stable product, the lipase cream is dried and de-fatted. To prevent inactivation, several precautions must be taken: (1) the temperature must not be above 30° C., (2) if all the fat is to be removed from the preparation, the water must be first completely removed before removal of all the fat since the lipase is inactivated by water if not fat is present. A suitable method of preparing the dried powder is to first remove water by lyophilization—that is, freezing the material and subjecting it to vacuum while frozen to remove all the water. As an alternative, the cream may be refluxed under reduced pressure with an organic solvent which boils at 30° C. or less (at the reduced pressure) such as hexane, heptane, petroleum ether, etc. In this process, the overhead vapors are condensed and allowed to settle, the water phase is separated and the solvent phase is re-circulated to the distilling vessel. The distillation is continued until no more water vapor comes over with the overhead— this type of drying is sometimes referred to as "azeotropic drying." The dried material, however produced, is then extracted several times with a fat solvent such as hexane, heptane, or petroleum ether to remove the fat. The resulting dry, de-fatted lipase can be stored for long periods at room temperature without loss of activity. Samples have been stored, for example, for a year with virtually no diminution of lipolytic acivity. It is to be noted that since this product is fat-free, it will be inactivated by contact with water. Hence it must be kept in sealed containers and when applied to a reaction it must first be mixed with the glyceride reactant before it is contacted with water.

In conducting a partial hydrolysis in accordance with this invention, it is only necessary to commingle the required reagents—glyceride oil, lipase preparation, and water—forming a water-in-oil emulsion and allow the mixture to react until equilibrium is substantially attained. Since the proportion of water in the hydrolysis mixture is critical, care should be taken that the total amount of water initially present is in the range about from 0.5 to 2.5%. If water is present in either the oil or the lipase preparation, or both, the amount of water added must be reduced so that the total quantity of water present is in the above range.

When using the lipase cream preparation, the reactants can be mixed in any order. However, in the case of the dry, de-fatted powder, this must first be incorporated with the oil or part of the oil prior to contact with water thus to avoid inactivation of the lipase.

The hydrolysis reaction is usually carried out at room temperature for convenience. To increase the rate of reaction higher temperatures may be used up to about 35° C. Since temperatures below room temperature decrease the reaction rate, we prefer in general to use a temperature in the range of about 20 to 35° C.

When applying the process to a normally-solid fat, it is preferable to first melt the solid material and then cool it to the above temperature range before incorporating the lipase. Most normally-solid fats form a supercooled liquid state so that it is possible to have them in a liquid state and still at the desired low temperature whereby the enzyme can be added without danger of inactivation. If the fat solidifies after incorporation of the enzyme and water, no harm is done—the reaction takes place just the same.

During the hydrolysis reaction the mixture should be stirred gently if at all. Violent agitation should not be used as it may inactivate the lipase. A convenient and safe way of agitation is to bubble an inert gas such as nitrogen or carbon dioxide through the mixture.

The amount of lipase preparation required in the partial hydrolysis may be varied greatly since the proportion of lipase merely affects the speed of the hydrolysis but not the proportion of end products. To effect establishment of equilibrium in a relatively short time we prefer to use about 1 to 10 parts of the dry lipase powder per 1000 parts oil. Since the lipase cream is not as concentrated, one would use about 10 to about 100 parts of this preparation per 1000 parts of oil. In any case, we prefer to allow the system to come to equilibrium which takes several hours but is usually conducted longer to ensure such condition. The fact of equilibrium can be determined by titrating the free acid content from time to time and noting when it has become constant.

After the reaction has reached completion, the reaction mixture is heated in the range 100°–150° C. for a few minutes to inactivate the enzyme. The product which may be filtered while hot to remove suspended material is then ready for use.

As an alternative method of procedure particularly to decrease the proportion of fatty acids, one may add glycerol to the reaction mixture. The glycerol will react with at least part of the free fatty acids so that the end product will contain a higher proportion of partial glycerides to fatty acids than when the reaction is conducted in the absence of glycerol. The amount of glycerol to be added can be calculated by stoichiometry from the amount of free fatty acids expected to be produced in the absence of the glycerol under the conditions chosen. Usually, it is simple to add an excess, say, from about 0.1 to 1 part of glycerol per part of fat. Application of this technique is illustrated in Example V.

The expression "glyceride oil" is used in the specification and claims to mean a tri-glyceride of a fatty acid and includes the normally-liquid materials such as olive oil, cottonseed oil, linseed oil, soybean oil, peanut oil, fish oils, sesame oil, whale oil, as well as the normally-solid materials such as lard, tallow, hydrogenated vegetable oils, etc.

The following examples illustrate the invention in greater detail, experiments outside of the scope of this invention being included for comparative purposes. The activity of the lipase preparations is expressed as specific lipase activity meaning the milliequivalents of acid liberated per minute per gram of the substance in question.

*Example I*

Shelled castor beans (25 g.) were ground in a mortar in the presence of 50 cc. water to form a paste. This paste was transferred to a beaker with the aid of 25 cc. of water. The resulting lipase milk was stored overnight in a covered beaker at 2°–4° C. The next day, about an equal quantity of potassium acid phthalate solution (0.2 M, pH 4.25) was added and the milk adjusted to pH 4.5 by addition of hydrochloric acid. The milk was then centrifuged, the cream being washed with distilled water and re-centrifuged. A yield of 19.9 grams of the lipase cream was obtained having a specific lipase activity of 0.55.

Example II

A portion of the lipase cream as prepared in Example I was frozen and subjected to vacuum until dry. The dry product was then extracted several times with petroleum ether until it was free from fat. The product had a specific lipase activity of 7.33.

Example III (A) Fifty milligrams of lipase powder as prepared in Example II was mixed with 50 g. of olive oil and into the mixture was incorporated 1.25 g. of water with agitation. The reaction mixture was allowed to stand at about 25° C. until equilibrium was reached.

(B to E) The procedure as above described was repeated using different amounts of water as follows: B, 1.58; C, 1.92 g., D, 2.25 g., E, 5.25 g.

The results obtained are tabulated below:

| Expt. | Proportion of water, percent | Proportion of products and residual oil, percent | | | |
|---|---|---|---|---|---|
| | | Fatty acids | Mono-glycerides | Diglycerides | Triglycerides |
| A | 2.5 | 32.2 | 11.6 | 21.5 | 34.7 |
| B | 3.16 | 37.7 | 13.2 | 19.0 | 30.1 |
| C | 3.84 | 42.2 | 13.0 | 16.3 | 28.5 |
| D | 4.5 | 46.4 | 12.1 | 18.0 | 23.5 |
| E | 10.5 | 70.0 | 5.8 | 11.8 | 12.4 |

The above data illustrate the critical effect of water on the hydrolysis. This fact is more clearly demonstrated by the following table which gives the proportion of partial glycerides (mono- and di-glycerides) to fatty acids in the product. Thus:

| Expt. | Proportion of water, percent | Proportion of partial glycerides to fatty acids in product |
|---|---|---|
| A | 2.5 | 1.03 to 1. |
| B | 3.16 | 0.85 to 1. |
| C | 3.84 | 0.69 to 1. |
| D | 4.5 | 0.65 to 1. |
| E | 10.5 | 0.25 to 1. |

Example IV (A) One and one-half grams of lipase cream as prepared in Example I was incorporated with 150 g. cottonseed oil. No water was added to this reaction but note that the lipase cream furnished 0.75 g. of water. The reaction mixture was allowed to stand for several days at 21° C. until substantial equilibrium was reached.

(B-D) The procedure as above outlined was repeated but adding varying quantities of water as follows:

B. 1.2 g. (total water 1.95 g.)
C. 3.0 g. (total water 3.75 g.)
D. 6.0 g. (total water 6.75 g.)

The results obtained are tabulated below:

| Expt. | Proportion of water, percent | Proportion of products and residual oil, percent | | | |
|---|---|---|---|---|---|
| | | Fatty acids | Mono-glycerides | Diglycerides | Triglycerides |
| A | 0.5 | 9.3 | 1.4 | 14.3 | 75.0 |
| B | 1.3 | 18.6 | 3.8 | 25.4 | 52.2 |
| C | 2.5 | 31.0 | 8.3 | 26.8 | 33.5 |
| D | 4.5 | 46.6 | 10.4 | 23.3 | 19.7 |

The effect of the water on the proportion of partial glycerides is illustrated by the following table:

| Expt. | Proportion of water, percent | Proportion of partial glycerides to fatty acids in product |
|---|---|---|
| A | 0.5 | 1.69 to 1. |
| B | 1.3 | 1.57 to 1. |
| C | 2.5 | 1.1 to 1. |
| D | 4.5 | 0.72 to 1. |

Example V

A sample of cottonseed oil (143.7 g.) was mixed with 1.5 g. lipase cream, as prepared in Ex. I, and 105.8 g. of 85% glycerol. The mixture was maintained at 10° C. for 10 days and agitated by bubbling nitrogen through the mixture. The reaction mixture was found to contain 77.7% triglycerides, 8.5% diglycerides, 6.8 monoglycerides, and 7.0% free fatty acids.

Having thus described our invention, we claim:

1. In the process of hydrolyzing a glyceride oil with a lipase preparation, the improvement which comprises conducting the hydrolyses in the presence of an initial amount of water about from 0.5% to 2.5%, based on the weight of oil, whereby to obtain a product which contains a proportion of partial glycerides at least as great as the proportion of fatty acids therein.

2. A process for partially hydrolyzing a glyceride oil which comprises subjecting the oil to the action of a lipase preparation in the presence of about from 0.5% to 2.5% of water, based on the weight of oil, whereby to obtain a product which contains a proportion of partial glycerides at least as great as the proportion of fatty acids therein.

3. A process for partially hydrolyzing a glyceride oil which comprises subjecting the oil to the action of castor bean lipase in the presence of about from 0.5% to 2.5% of water, based on the weight of oil, whereby to obtain a product which contains a proportion of partial glycerides at least as great as the proportion of fatty acids therein.

References Cited in the file of this patent

Longenecker et al., J. A. C. S. 57 (1935) pages 2019–2021.